US009862299B2

(12) United States Patent
Johnson

(10) Patent No.: US 9,862,299 B2
(45) Date of Patent: Jan. 9, 2018

(54) VEHICLE WITH DEPLOYABLE WORKOUT ASSEMBLY

(71) Applicant: Benjamin Johnson, Floresville, TX (US)

(72) Inventor: Benjamin Johnson, Floresville, TX (US)

(*) Notice: Subject to any disclaimer, the term of this patent is extended or adjusted under 35 U.S.C. 154(b) by 0 days.

(21) Appl. No.: 15/284,165

(22) Filed: Oct. 3, 2016

(65) Prior Publication Data

US 2017/0096091 A1 Apr. 6, 2017

Related U.S. Application Data

(60) Provisional application No. 62/235,713, filed on Oct. 1, 2015.

(51) Int. Cl.
B60P 3/00 (2006.01)
B60P 3/025 (2006.01)
B60R 11/00 (2006.01)
B60R 99/00 (2009.01)
A63B 21/16 (2006.01)

(52) U.S. Cl.
CPC ............. B60P 3/00 (2013.01); B60P 3/0257 (2013.01); B60R 11/00 (2013.01); B60R 99/00 (2013.01); A63B 21/16 (2013.01); B60R 2011/004 (2013.01); B60R 2011/0082 (2013.01)

(58) Field of Classification Search
CPC .......... B60P 3/0257; B60P 3/025; B60P 3/00; B60R 11/00; A63B 21/16
USPC ................................. 296/24.3, 22
See application file for complete search history.

(56) References Cited

U.S. PATENT DOCUMENTS

| 3,809,425 | A | * | 5/1974 | Blaschke | B60P 3/38 135/904 |
| 5,667,267 | A | | 9/1997 | Talucci | |
| 5,816,646 | A | | 10/1998 | Combest | |
| 5,833,295 | A | * | 11/1998 | Farlow, Jr. | B60P 3/14 296/22 |
| 7,699,762 | B2 | | 4/2010 | Turnbull et al. | |
| 8,485,951 | B1 | * | 7/2013 | Adams | A63B 21/04 224/403 |
| 9,302,144 | B1 | * | 4/2016 | Benavides | A63B 21/068 |
| 9,750,999 | B2 | * | 9/2017 | Monaco | A63B 71/023 |
| 2004/0000800 | A1 | * | 1/2004 | Dalpizzol | B60J 5/101 296/163 |
| 2010/0089378 | A1 | * | 4/2010 | Babington | B60P 3/0257 126/21 R |

(Continued)

Primary Examiner — Jason S Morrow
(74) Attorney, Agent, or Firm — Global Intellectual Property Agency, LLC; Jordan Sworen

(57) ABSTRACT

A vehicle having a deployable workout assembly. The vehicle includes a frame that is slidably attached to the upper surface thereof. The frame includes a pair of support legs for supporting the longitudinal members aloft. The assembly further includes one or more crossbars extending across the members, which can be utilized for pull-ups and other such exercises. The support legs include one or more sets of spotters thereon, which can be utilized to support barbells and other such objects. In combination, the vehicle provides a mobile fitness center that can be deployed, utilized for exercise, and then stowed with minimal time and effort. The vehicle can additionally include various storage containers within the interior of the cargo area for storing weights and other objects.

9 Claims, 4 Drawing Sheets

(56) References Cited

U.S. PATENT DOCUMENTS

| | | | |
|---|---|---|---|
| 2013/0053220 A1 | 2/2013 | Monaco | |
| 2013/0334833 A1* | 12/2013 | Karapetian, Jr. | B60P 3/0257 |
| | | | 296/22 |
| 2014/0296037 A1 | 10/2014 | Razzaq | |
| 2015/0059257 A1* | 3/2015 | Beaver | A63B 17/00 |
| | | | 52/27 |
| 2016/0059104 A1* | 3/2016 | Monaco | E04H 3/14 |
| | | | 280/30 |
| 2016/0059105 A1* | 3/2016 | Scade Garcia | E04H 1/12 |
| | | | 52/69 |
| 2017/0100624 A1* | 4/2017 | Young | A63B 21/078 |
| 2017/0115009 A1* | 4/2017 | Ramphos | F24C 15/2042 |
| 2017/0136278 A1* | 5/2017 | Gilchrist | A63B 17/00 |
| 2017/0209733 A1* | 7/2017 | Beaver | A63B 21/169 |

\* cited by examiner

VEHICLE WITH DEPLOYABLE WORKOUT ASSEMBLY

CROSS REFERENCE TO RELATED APPLICATIONS

This application claims the benefit of U.S. Provisional Application No. 62/235,713 filed on Oct. 1, 2015. The above identified patent application is herein incorporated by reference in its entirety to provide continuity of disclosure.

BACKGROUND OF THE INVENTION

The present invention relates to workout apparatuses. More specifically, the present invention relates to workout assemblies in combination with vehicles.

Many people wish to improve their physical fitness and overall health. One way to improve health and fitness is to utilize devices such as weights and other fitness machines to increase strength, stamina, or other physical attributes. Fitness machines are often heavy and bulky and as such must be kept in a single location. This is disadvantageous to those who travel or those who have little time to work out. The present invention provides a fitness system that may be mounted to the rear of a vehicle so that users may utilize the fitness system in any location.

SUMMARY OF THE INVENTION

In view of the foregoing disadvantages inherent in the known types of workout assemblies now present in the prior art, the present invention provides a vehicle having a deployable workout assembly. A vehicle having a deployable workout assembly. The vehicle includes a frame that is slidably attached to the upper surface thereof. The frame includes a pair of support legs for supporting the longitudinal members aloft. The assembly further includes one or more crossbars extending across the members, which can be utilized for pull-ups and other such exercises. The support legs include one or more sets of spotters thereon, which can be utilized to support barbells and other such objects. In combination, the vehicle provides a mobile fitness center that can be deployed, utilized for exercise, and then stowed with minimal time and effort. The vehicle can additionally include various storage containers within the interior of the cargo area for storing weights and other objects.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
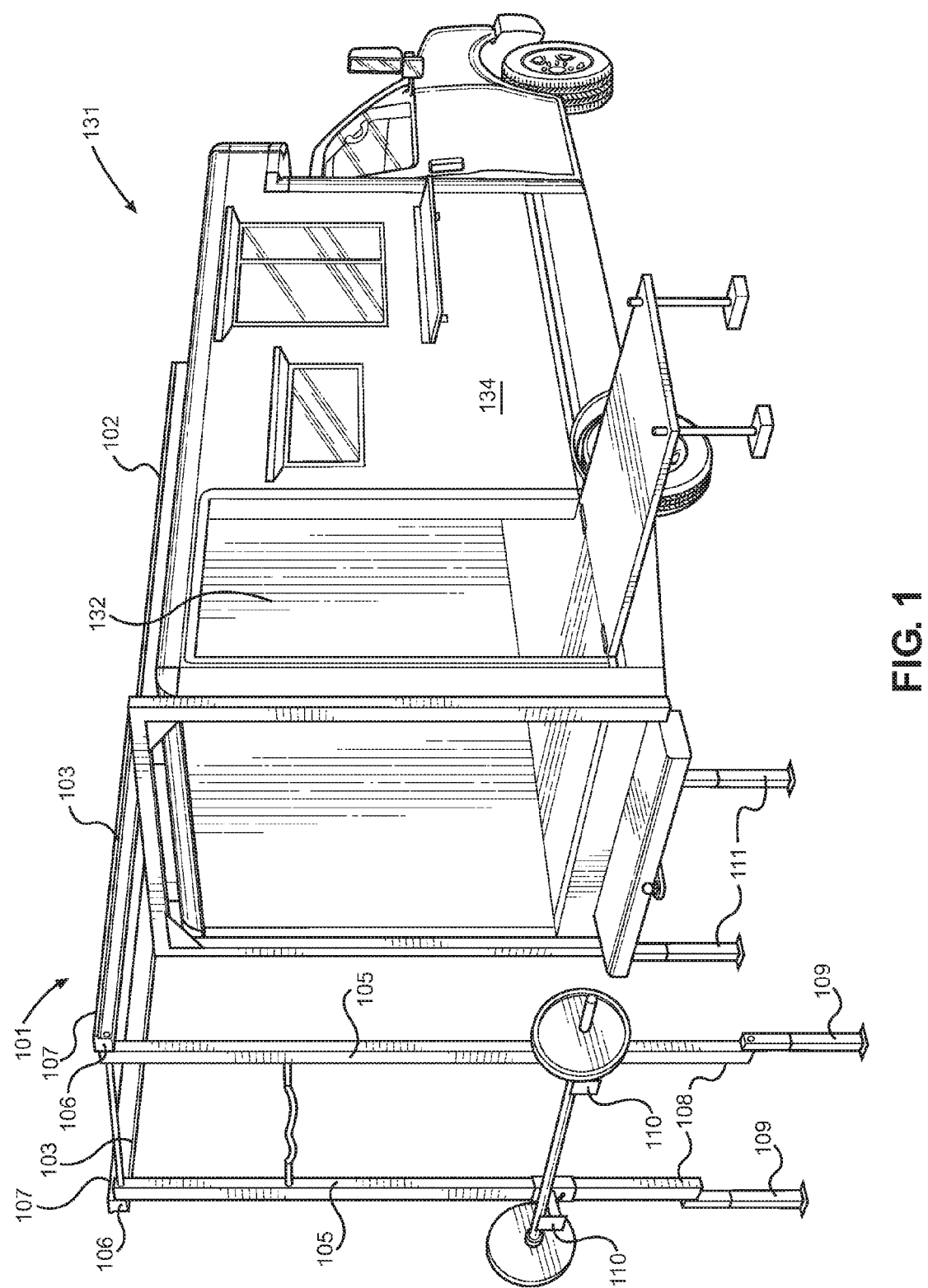
FIG. 1 shows a perspective view of a vehicle having a deployable workout assembly.

Reference is made herein to the attached drawings. Like reference numerals are used throughout the drawings to depict like or similar elements of the vehicle having a deployable workout assembly. The figures are intended for representative purposes only and should not be considered to be limiting in any respect.

Referring now to FIG. 1, there is shown a perspective view of a vehicle having a deployable workout assembly. The vehicle 131 includes a workout assembly 101 that is slidably attached to its top surface 133 and is deployable from the rear of the vehicle 131. In an illustrative embodiment, the vehicle 131 is a box truck and the workout assembly 101 is deployable from the cargo area 132 thereof; however, no limitation on a specific type of vehicle or automobile is intended.

The workout assembly 101 includes a pair of rails 102 that are fixedly attached to the top surface 132 of the vehicle 131. A pair of complementary members 103 are slidably engaged with the rails 102, allowing the members 103 to slide longitudinally relative to the vehicle 131. The assembly 101 further includes one or more crossbars 104 extending between the members 103, perpendicular relative to the longitudinal axis of the members 103. The assembly 101 still further includes a support leg 105 attached via a pivot 106 or hinge to a distal end 107 of each of the members 103. The pivot 106 is configured to provide at least a ninety-degree range of motion to the support legs 105, such that the support legs 105 can transition from a stowed position adjacent to the member 103 to a deployed position perpendicular relative to the members 103. When deployed, the support legs 105 support the members 103 aloft.

In one embodiment, the support legs 105 are adjustable in length. In this embodiment, the support legs 105 can include a telescopic section. In one embodiment, the support legs 105 additionally or alternatively include stabilizers 109 disposed at the distal ends 108 thereof. The stabilizers 109 include secondary support legs pivotably that are attached to the distal ends 108 of the support legs 105, hydraulic stabilization legs, or any other such structure known in the art. In the embodiment wherein the stabilizers 109 are pivotable secondary support legs, users can selectively deploy the secondary support leg at each of the support legs 105 in order to accommodate for uneven terrain. The secondary support legs can additionally be fixed in length or telescopic. In the embodiment wherein the stabilizers 109 are hydraulic stabilization legs, the hydraulics can include manual or automatic controls.

The support legs 105 further include spotters 110 positioned along their lengths. The spotters 110 are protuberances extending from the support legs 105 that are intended for use with barbells. The spotters 110 are arranged in multiple pairs at different heights, wherein respective spotters 110 in each pair are aligned with each other such that they can support a barbell or another such device thereacross.

When deployed, the workout assembly 101 provides individuals with a frame on which various exercise can be performed off of the rear of the vehicle 131, with or without the additional use of accessories. When the members 103 are extended and the support legs 105 are deployed, individuals can perform pull-ups and other such exercises on the crossbars 104 and utilize the spotters 110 to support barbells between bench presses, curls, and other such barbell-based exercises. Furthermore, various accessories can be utilized in conjunction with the assembly 101. For example, the equipment system can include a rope-pulley systems can be secured to the crossbars 104 for performing resistance training, a wall board that can be placed against the assembly 101 for wall throws, or any other such fitness system known in the art.

In one embodiment, the vehicle 131 further includes one or more stabilizations legs 111 disposed along the rear edge of the vehicle 131. The stabilization legs 111 include hydraulic stabilization legs. The stabilization legs 111 are configured to secure the vehicle 131 in place, thereby preventing the vehicle 131 moving when users are performing exercises on the workout assembly 101.

Figure 2:
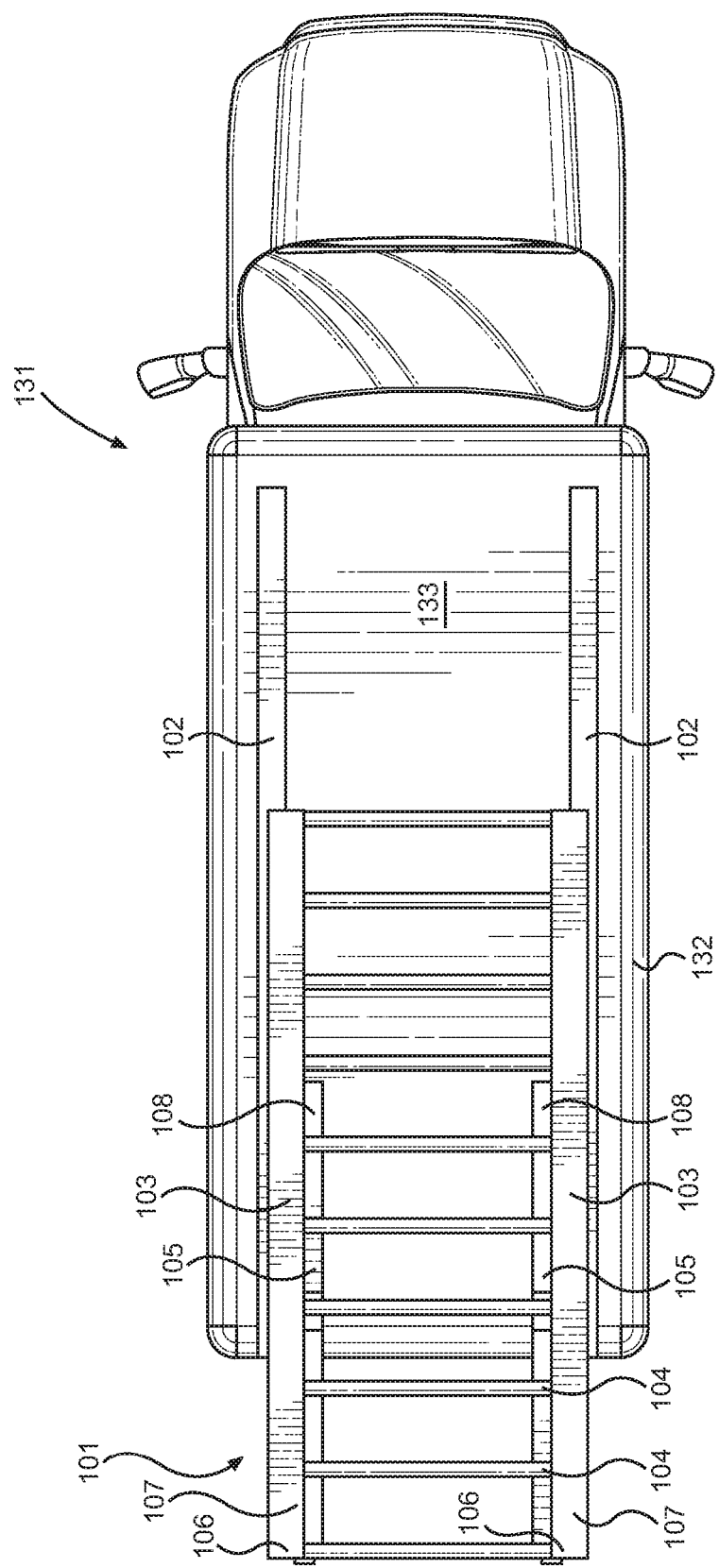
FIG. 2 shows a top-down elevational view of a vehicle having a deployable workout assembly.
Figure 3:
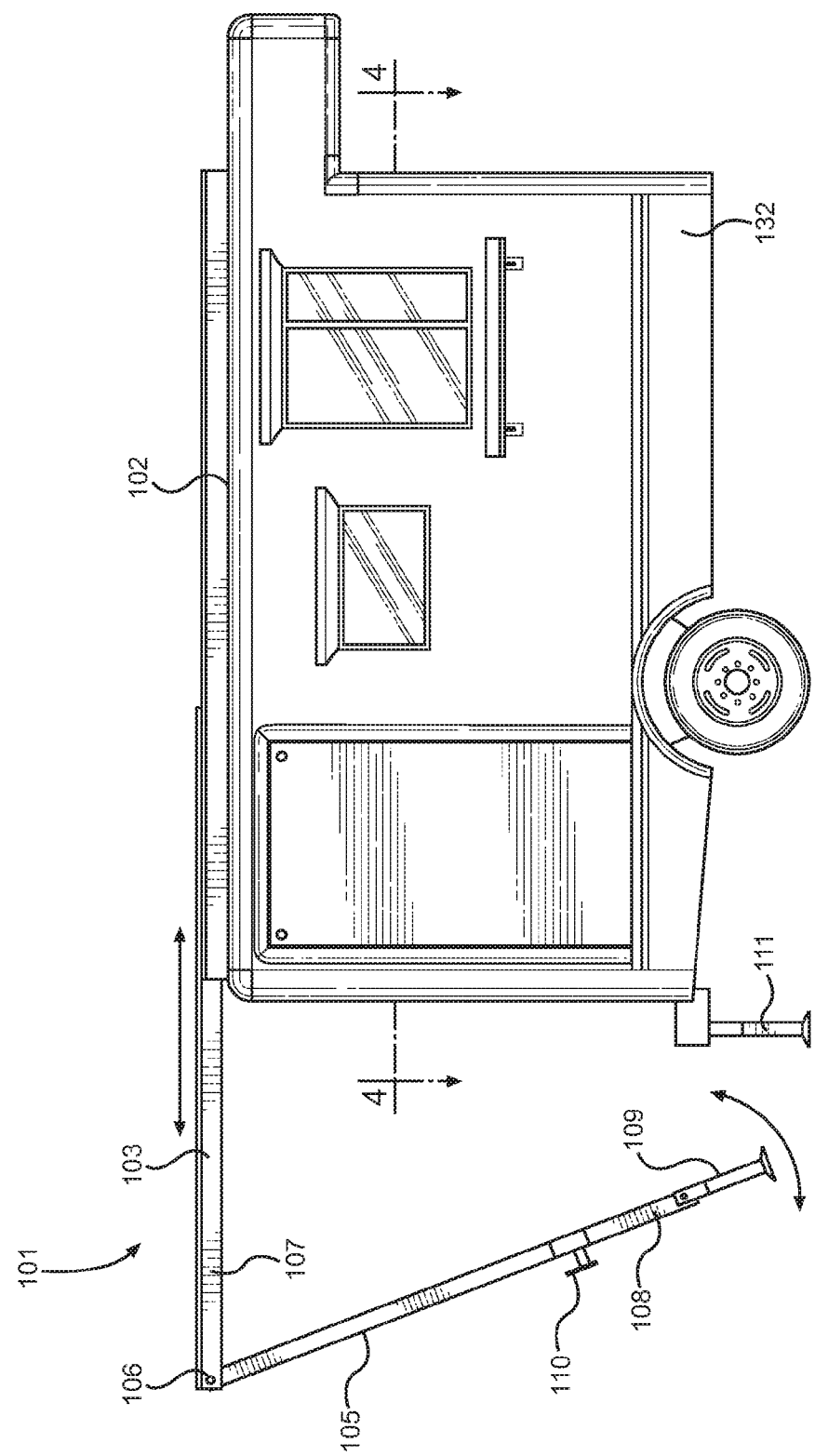
FIG. 3 shows a side elevational view of a vehicle having a deployable workout assembly.

Referring now to FIGS. 2-3, there are shown a top-down elevational view and a side elevational of a vehicle having a deployable workout assembly. The slidable connection between the members 103 and the rails 102 allows the members 103 to be extended longitudinally from the rear of the vehicle 131. When stowed, the support legs 105 rest adjacently to the members 103 along the top surface 133 of the vehicle 131. When the members 103 are extended far enough from the vehicle 131 such that the support legs 105 are no longer overlying the top surface 131, the support legs 105 can be swung down to the deployed position, substantially perpendicular to the horizontally positioned members 103. The length of the support legs 103 can then be independently adjusted to accommodate the underlying terrain.

In one embodiment, the length of the support legs 105 is substantially equal to the height of the cargo area 132 of the vehicle 131, thereby allowing the support legs 105 to support the members 103 aloft on a relatively planar surface with minimal adjustment. The components of the workout assembly can be constructed from steel or other such rigid materials configured to withstand the weight of individuals exercising thereon, weights, and other such objects.

Figure 4:
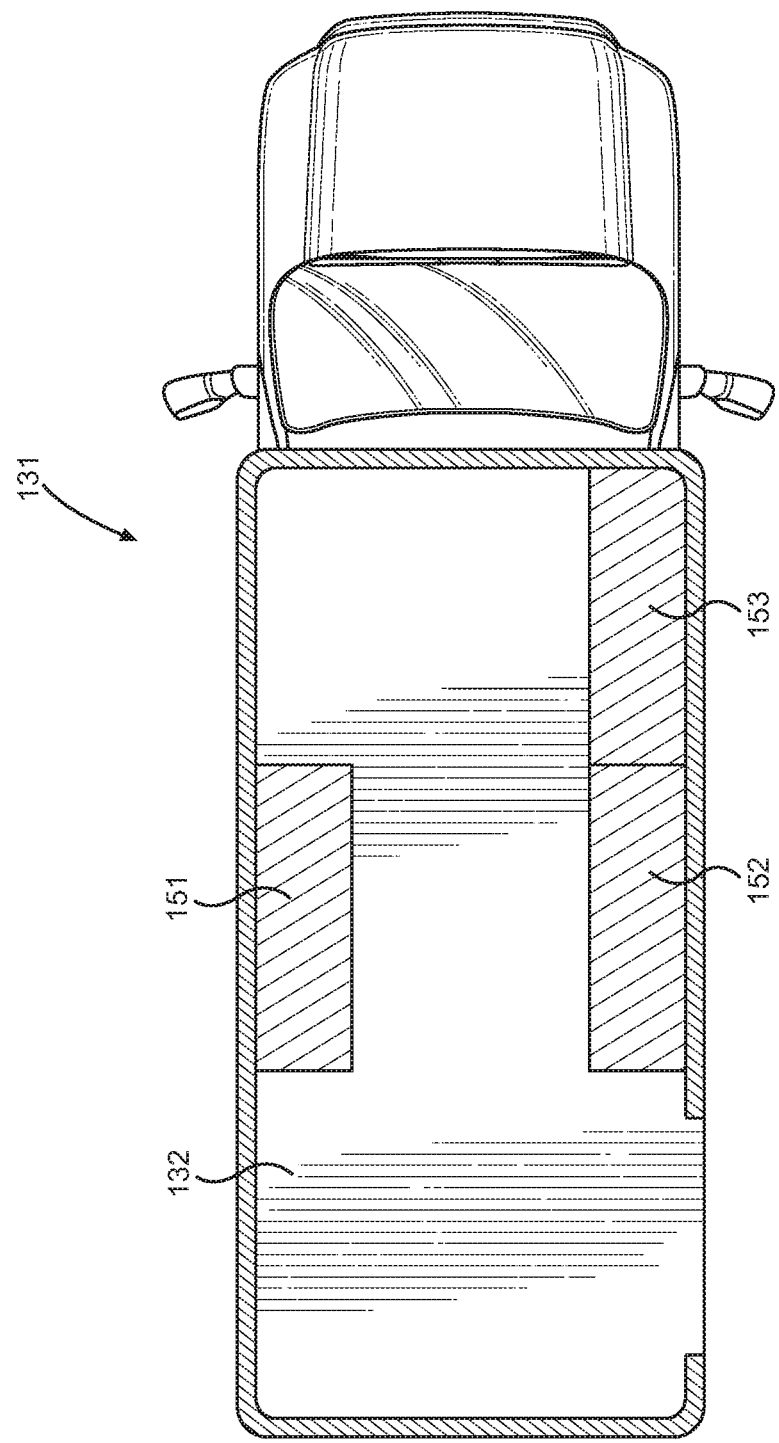
FIG. 4 shows a sectional view along line 4-4 of a cargo area of a vehicle having a deployable workout assembly.

Referring now to FIG. 4, there is shown a sectional view along line 4-4 of a cargo area of a vehicle having a deployable workout assembly. In one embodiment, the cargo area 132 further includes a plurality of receptacles or storage containers 151 therein for storing weights and other workout gear. The storage containers 151 can be disposed throughout the interior of the cargo area 132.

In one embodiment, the vehicle 131 further includes a variety of food preparation equipment disposed within the interior of the cargo area 132. Such food preparation can include a food preparation counter 152, e.g., a cutting board, a refrigerator 153, and other such food preparation equipment, such as a cooking surface. In this embodiment, the vehicle 131 can be utilized to serve patrons food, in addition to providing them with the workout assembly 101, so that the vehicle 131 can serve as a combination of a food truck and a gym to patrons.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle, comprising:
    a first rail and a second rail disposed along a top surface of the vehicle;
    a first member slidably engaged with the first rail;
    a second member slidably engaged with the second rail;
    a crossbar extending between the first member and the second member;
    a first leg pivotably attached to a distal end of the first member;
    a second leg pivotably attached to a distal end of the second member;
    each of the first leg and the second leg configured to pivot from a stowed position parallel to the first member and the second member to a deployed position perpendicular to the first member and the second member; and
    each of the first leg and the second leg including a spotter thereon.

2. The vehicle of claim 1, further comprising an interior cargo area, the interior cargo area including a plurality of containers.

3. The vehicle of claim 1, further comprising a stabilizer adjustably disposed at a distal end of each of the first leg and the second leg.

4. The vehicle of claim 1, wherein the first leg rests flush adjacently against the first member and the second leg rests flush adjacently against the second member when in the stowed position.

5. The vehicle of claim 1, wherein the vehicle is a box truck.

6. The vehicle of claim 1, further comprising a side door pivotably disposed on a lateral surface of the vehicle, the side door providing access to an interior cargo area.

7. The vehicle of claim 1, wherein the first leg and the second leg are telescopic.

8. The vehicle of claim 1, further comprising stabilization legs disposed on the vehicle, the stabilization legs configured to secure the vehicle in place.

9. The vehicle of claim 1, further comprising food preparation equipment disposed within an interior of the vehicle, the food preparation equipment including a refrigerator and a food preparation counter.

* * * * *